United States Patent

Eguchi et al.

[11] Patent Number: 5,113,477
[45] Date of Patent: May 12, 1992

[54] PLASTIC OPTICAL FIBERS FROM POLYMERS DERIVED FROM METALLIC SALTS OF ETHYLENIC CARBOXYL MONOMERS

[75] Inventors: Shuji Eguchi; Noriaki Taketani; Seikichi Tanno; Yoshiaki Okabe; Hiromu Terao, all of Hitachi; Hideki Asano, Mito; Motoyo Wajima, Hadano; Tomiya Abe, Hitachi, all of Japan

[73] Assignee: Hitachi, Ltd., Tokyo, Japan

[21] Appl. No.: 483,294

[22] Filed: Feb. 20, 1990

Related U.S. Application Data

[60] Division of Ser. No. 265,558, Nov. 1, 1988, abandoned, which is a continuation of Ser. No. 927,940, Nov. 7, 1986, abandoned.

[30] Foreign Application Priority Data

Nov. 8, 1985 [JP] Japan .............................. 60-248734

[51] Int. Cl.$^5$ ....................... G02B 6/02; C08F 220/04
[52] U.S. Cl. ................... 385/143; 526/240; 526/241; 385/144
[58] Field of Search ................... 350/96.34, 96.29, 96.3

[56] References Cited

U.S. PATENT DOCUMENTS 4,429,094 1/1984 Massucco ............................ 526/240
4,687,295 8/1987 Koishi ............................ 350/96.34

OTHER PUBLICATIONS

Kaino, T., Appl. Phys. Lett., 48 (12), Mar. 24, 1986, pp. 757, 758.
Kaino, T. J. Appl. Phys., 24(12), Dec. 12, 1985, pp. 1661-1665.
EP 0,108,985, Publ May 23, 1984.

Primary Examiner—Christopher Henderson
Attorney, Agent, or Firm—Antonelli, Terry, Stout & Kraus

[57] ABSTRACT

A plastic optical fiber comprising a core and a clad, said core being formed by an amorphous and optically transparent polymer and said clad being formed by a polymer having a refractive index lower than that of the core by at least 0.3%, at least one of the core and the clad being formed by an amorphous and optically transparent polymer containing metal elements and halogen atoms, is low in light loss and excellent in heat resistance.

11 Claims, No Drawings

PLASTIC OPTICAL FIBERS FROM POLYMERS DERIVED FROM METALLIC SALTS OF ETHYLENIC CARBOXYL MONOMERS

This application is a divisional of application Ser. No. 07/265,558, filed Nov. 1, 1988, now abandoned, which is a continuation of application Ser. No. 927,940, filed Nov. 7, 1986, now abandoned.

BACKGROUND OF THE INVENTION

This invention relates to a plastic optical fiber low in light loss in the visible light region to near infrared region and excellent in heat resistance, a process for producing the same, and a transparent resin having a high refractive index and a low chromatic aberration usable for such a plastic optical fiber.

Recently plastic optical fibers have been noticed as fibers for transmitting information in cars and buildings due to their advantages in having a larger core diameter or aperture and flexibility compared with glass optical fibers. Heretofore, polystyrene and acrylic resins such as poly(methyl methacrylate) and the like synthetic resin materials excellent in transparency have been used as the core material in plastic optical fibers. But these materials had a defect in that the decay in light transmission through the fiber is large compared with the glass-made fiber. Thus, there have been made various proposals to reduce the light loss in plastic optical fibers.

According to an article disclosed in Japanese Journal of Applied Physics vol. 24, No. 12, pp. 1661-1665 (1985), major factors for the light loss during transmission in the visible light region to near infrared region in plastic optical fibers are an absorption loss caused by high harmonics in infrared vibration absorption between the carbon to hydrogen bond and the Rayleigh scattering loss caused by fluctuation in the density or concentration. In order to reduce the absorption loss, it is proposed to use a plastic optical fiber having a core made from a polymeric material containing heavy hydrogens (Japanese Patent Unexamined Publication No. 54-65536). It is also proposed to introduce carbonfluorine bonds into polymeric materials in order to reduce the vibration absorption of carbon-hydrogen bonds as well as the Rayleigh scattering (Appl. Phys. Lett. 48(12), pp. 757-758, 24 Mar., 1986). But since the polymeric materials used as the core materials in these plastic optical fibers are so-called polymethacrylate esters introducing carbon-heavy hydrogen bonds or carbon-fluorine bonds in place of carbon-hydrogen bonds, the heat resistance is as low as 70° to 80° C. at most. Further, since the glass transition temperature (Tg) of fluoroalkyl methacrylate polymers or fluoroalkyl acrylate polymers is 75° C. or lower, the heat resistance is further lowered. In addition, it is known that since methyl methacrylate polymers containing heavy hydrogens easily absorb moisture, the light loss becomes large. As mentioned above, the plastic optical fibers had a defect in that initial properties were easily deteriorated by changes of circumstances.

On the other hand, it is an effective method to introduce heavy metal atoms into plastics for making the refractive index of plastics higher. Techniques relating to metal-containing plastic lens materials are disclosed, for example, in U.S. Pat. Nos. 3,920,605 and 3,886,125. But monomers having covalent bonds with metals or metal salts of carboxylic acids having double bonds are generally poor in solubility in styrene or a styrene derivative. Further, even if only one kind of these metal salts of carboxylic acids is copolymerized with a reactive monomer such as chlorostyrene, the resulting resin is poor in transparency and still has a problem as a material for plastic lenses. In addition, in order to maintain the high transparency of the resin, it is necessary to remarkably reduce the amount of metal contained in the resin, which results in making it impossible to maintain the high refractive index of the resin.

SUMMARY OF THE INVENTION

Objects of this invention are to provide a plastic optical fiber having a core-cladding structure low in light loss in the visible light region to the near infrared region and excellent in heat resistance, a process for producing the same, and a low dispersion and high refractive index resin excellent in transparency and heat resistance and usable as a material for producing the plastic optical fiber.

This invention provides a plastic optical fiber comprising a core and a clad, said core being formed by an amorphous and optically transparent polymer and clad being formed by a polymer having a refractive index lower than that of the core by at least 0.3%, at least one of the core and the clad being formed by an amorphous and transparent polymer containing metal elements and halogen atoms.

This invention also provides a process for producing a plastic optical fiber which comprises supplying to a core-clad spinneret an amorphous and optically transparent polymer as a core material and a polymer having a refractive index lower than that of the core material by at least 0.3% as a cladding material, at least one of the core material and the cladding material being an amorphous and transparent polymer containing metal elements and halogen atoms, and conducting complex melt spinning.

This invention further provides a process for producing a plastic optical fiber which comprises carrying out polymerization and curing of monomers for a core forming amorphous and optically transparent polymer in a tube or a pipe having a constant diameter, and if necessary carrying out post-curing to give a half-cured or completely cured fibrous polymer as a core material, and coating the core material with a polymer having a refractive index lower than that of the core material by at least 0.3% to form a clad, at least one of the core and the clad being formed by an amorphous and transparent polymer containing metal elements and halogen atoms.

This invention still further provides an amorphous and optically transparent polymer containing metal elements and halogen atoms and having a low optical dispersion and a high refractive index and constituting units of the formulae:

 (I-a),

 (I-b), and

 (I-c)

wherein R is a group forming a polymer main chain; R' is a halogen-containing aliphatic or aromatic hydrocarbon group; M is a metal element; and n is a valence of the metal element M.

DESCRIPTION OF THE PREFERRED EMBODIMENTS

The amorphous and optically transparent polymer containing metal elements and halogen atoms and having constituting units of the formulae:

  (I-a),

  (I-b), and

  (I-c)

wherein R is a group capable of forming a polymer main chain, e.g., an alkylene group which may be substituted with an alkyl group, etc.; R' is a halogen-containing aliphatic or aromatic hydrocarbon group wherein the halogen is preferably chlorine and/or bromine and/or fluorine; M is a metal element; and n is a valence of the metal element M, is low in the absorption loss and the Rayleigh scattering loss, and optically transparent although containing both metal elements and halogen atoms, so that it is an excellent material for not only general optical devices but also core materials as well as cladding (or sheath) materials for plastic optical fibers.

The polymer containing metal elements and halogen atoms and useful as optical materials is characterized by having a light transmittance of 80% or higher measured according to ASTM 1003. The refractive index of the polymer is 1.55 or less in the case of containing fluorine atoms as the halogen atoms and 1.65 or less, preferably 1.60 or less, in the case of containing chlorine or bromine atoms as the halogen atoms. Generally speaking, the lower the refractive index becomes, the smaller the light loss due to the Rayleigh scattering. Therefore, the refractive index of 1.60 or lower is desirable.

As to the refractive index, there is generally a relationship between the molecular refraction R and the molecular volume V of the molecule constituting a material according to the Lorenz-Lorentz formula:

$$\frac{n_D^2 - 1}{n_D^2 + 2} = \frac{R}{V}$$

In order to enhance the refractive index, there are a method for enlarging the molecular refraction R and a method for reducing the molecular volume V. In the case of enlarging the molecular refraction R, a group having high polarizability such as a benzene nucleus is introduced into the molecule. But, in such a case, the Abbe number which shows the dependency of refractive index on the wavelength is reduced and the chromatic aberration becomes large. On the other hand, when the method of reducing the molecular volume V is employed, a high refractive index can be obtained without enlarging the chromatic aberration.

In this invention, in order to lessen the V for low dispersion and high refractive index, metal-oxygen bonds and halogens such as chlorine, bromine, or fluorine, are introduced into the molecule at the same time. The introduction of only the metal-oxygen bonds into the molecule is already employed in optical inorganic glass and very effective for attaining the low dispersion and high refractive index. The present inventors have found that when halogens such as chlorine, bromine, etc. are introduced into the molecule, not only the molecular refraction R is enlarged but also the molecular volume V is reduced. Particularly, when resins contain bromine atoms, the low dispersion and high refractive index can easily be attained, in e.g. poly-2,3-dibromopropyl methacrylate [$n_D = 1.5739$ (20° C.), V=44].

In this invention, both the metal elements and halogen atoms are contained in the polymer, which results in attaining the low dispersion and high refractive index more effectively than hereto known resins. Further, in this invention, even both the metal elements and halogen atoms are introduced into the polymer, the polymer is unexpectedly excellent in optical transparency. Further, since the monomer composition comprising a plurality of organic carboxylic acids having the constituting units of the formulae (I-a) to (I-c) is good in compatibility with one or more radical polymerizable vinyl monomers and is ionically bonded to a group having a bulky structure at a side chain, the crystallization of the polymer can be prevented to maintain the transparency at a high level.

In order to introduce halogen atoms such as bromine, chlorine and fluorine atoms into the polymer in this invention, there is used an organic group containing one or more halogen atoms such as bromine, chlorine, and fluorine atoms as R' in the formula (I-c). By employing this method, it becomes possible not only to make the effect great for attaining the low dispersion and high refractive index, but also to widely employ various combinations with other radical polymerizable vinyl monomers because the monomer composition already contains both metal elements and halogen atoms.

As mentioned above, the polymer of this invention may contain a constituting unit derived from one or more radical polymerizable vinyl monomers in addition to the constituting units of the formulae (I-a) to (I-c). As the radical polymerizable vinyl monomers, there can be used any monomers which can form colorless and transparent polymers. Examples of such monomers are styrene, styrene derivatives which may contain one or more halogen atoms such as chlorostyrene, bromostyrene, fluorostyrene, etc., acrylic esters, methacrylic esters, halogen-containing acrylic esters and halogen-containing methacrylic esters.

When the above-mentioned polymer is used as a core material of plastic optical fibers, it is preferable to use polymers obtained by copolymerizing the monomer composition having constituting units of the formulae (I-a) to (I-c) with at least one vinyl monomer selected from the group consisting of alkyl methacrylates, alkyl acrylates, fluoroalkyl methacrylates and fluoroalkyl acrylates.

The amount of the monomer composition having the constituting units of the formulae (I-a) to (I-c) is decided depending on optical properties and heat resistance (Tg) of the desired resins, but preferably 0.1 to 50% by weight. When the amount is less than 0.1% by weight, the Tg of the resulting resin hardly rises and the heat resistance is hardly enhanced. On the other hand, when the amount is more than 50% by weight, the resulting resin becomes brittle and the strength as fibers cannot be maintained.

Monomers which can provide the constituting unit of the formula (I-a) are organic carboxylic acids, e.g. ethylenic mono- or dicarboxylic acids of the formula:

  (II)

wherein R is as defined above, and alkyl esters thereof. Examples of the organic carboxylic acids of the formula (II) and alkyl esters thereof are acrylic acid, metacrylic acid, itaconic acid, monoalkyl esters of itaconic acid, crotonic acid, maleic acid, monoalkyl esters of maleic acid, fumaric acid, glutaconic acid, citraconic acid, etc. Among them, methacrylic acid, acrylic acid, monoalkyl esters of itaconic acid and monoalkyl esters of maleic acid are preferable considering transparency and heat resistance.

Monomers which can provide the constituting unit of the formula (I-c) are halogen (Cl, Br, F, etc.)-containing saturated or unsaturated aliphatic or aromatic carboxylic acids of the formula:

  (III)

wherein R' is as defined above.

Examples of the halogen-containing saturated aliphatic carboxylic acids are difluoroacetic acid, trifluoroacetic acid, trichloroacetic acid, chlorodifluoroacetic acid, trifluoroacetic anhydride, pentafluoropropionic anhydride, heptafluorobutyric acid, pentafluoropropionic acid, perfluorodecanoic acid, perfluorooctanoic acid, perfluoroheptanoic acid, perfluorononanoic acid, 11H-eicosafluoroundecanoic acid, 3-trifluoromethyl-3-hydroxybutyric acid, bromopropionic acid, bromobutyric acid, bromovaleric acid, bromohexanoic acid, bromopentanoic acid, bromoundecanoic acid, α-bromoisobutyric acid, 2-bromo-3-methyl-n-butyric acid, dibromopropionic acid, chloropropionic acid, chlorobutyric acid, chlorovaleric acid, $\beta\beta'$-dichloropivalic acid, etc.

Examples of the halogen-containing unsaturated aliphatic carboxylic acids are $\beta$-trifluoromethylcrotonic acid, α-trifluoromethacrylic acid, etc.

Examples of the halogen-containing saturated aromatic carboxylic acids are bromobenzoic acid, α-bromo-p-toluic acid, bromophenylacetic acid, chlorobenzoic acid, chlorophenylacetic acid, chlorophenoxyacetic acid, dichlorophenoxyacetic acid, trichlorophenoxyacetic acid, trichlorophenoxypropionic acid, etc.

Examples of the halogen-containing unsaturated aromatic carboxylic acids are chlorocinnamic acid, dichlorocinnamic acid, etc.

These halogen-containing carboxylic acids and alkyl esters thereof can be used alone or as a mixture thereof. It is possible to use one or more saturated or unsaturated organic carboxylic acids containing no halogen together with the halogen-containing carboxylic acids. In order to make the absorption loss of the resulting polymer little, the use of the halogen-containing saturated or unsaturated aliphatic carboxylic acids and alkyl esters thereof is preferable.

As the metal element for providing the constituting unit of the formula (I-b), there can be used those having a small light absorption, preferably no light absorption in the form of metallic cations, in the visible light region to the near infrared region as the metal ion. Examples of the metal elements are Pb, Ba, Sr, Zn, Sn, Sb, Mg, Hg, Ca, La, Ti, Zr, Ta, Th, Nb, Tl, Ge, Cs, Cd, etc. Among them, Pb, Ba, Sr, Zn, Mg, Ca, La, Cd, and Hg are particularly preferable. These metal elements are selected depending on the required refractive index of the polymer. These metal elements can be used alone or as a mixture thereof.

It is also possible to use alkali metals as a metal having a small light absorption in addition to the metal elements mentioned above. But in such a case, since there is a tendency to enlarge the water absorption of the polymer, it is better not to use the alkali metals when the water absorption is a problem.

As the vinyl monomers copolymerizable with the monomer composition having the constituting units of the formulae (I-a) to (I-c), there can be used methyl methacrylate, ethyl methacrylate, n-propyl methacrylate, n-butyl methacrylate, t-butyl methacrylate, lauryl methacrylate, nonyl methacrylate, methyl acrylate, butyl acrylate, 2-ethylhexyl acrylate, styrene, halogen-containing styrenes such as chlorostyrene, bromostyrene, fluorostyrene, etc. In order to enhance not only the effect of lowering the vibration absorption of carbon-hydrogen bonds of the polymer but also the effects of lowering the refractive index of the polymer and reducing the Rayleigh scattering, it is preferable to use at least fluoroalkyl methacrylates and fluoroalkyl acrylates. This is particularly true, when the resulting polymer is used as the core material of plastic optical fibers.

Examples of the fluoroalkyl methacrylates are trifluoroethyl methacrylate, 2,2,3,3-tetrafluoropropyl methacrylate, 2,2,3,3,3-pentafluoropropyl methacrylate, 2-trifluoromethyl-3,3,3-trifluoropropyl methacrylate, 2-trifluoromethyl-2,3,3,3-tetrafluoropropyl methacrylate, 2,2,3,4,4,4-hexafluorobutyl methacrylate, 2,2,3,3,4,4,4-heptafluorobutyl methacrylate, 1-methyl-2,2,3,4,4,4-hexafluorobutyl methacrylate, 1,1,2,2-tetrahydroperfluorodecyl methacrylate, 1,1,2,2-tetrahydro-9-trifluoromethylperfluorodecyl methacrylate, 1,1-dihydroperfluorobutyl methacrylate, 1,1-dimethyl-2,2,3-tetrafluoropropyl methacrylate, 1,1-dimethyl-2,2,3,3,4,4,5,5-octafluoropentyl methacrylate, 1,1-dimethyl-2,2,3,3,4,4,4-hexafluorobutyl methacrylate, etc.

Examples of the fluoroalkyl acrylates are trifluoroethyl acrylate, 2,2,3,3,3-pentafluoropropyl acrylate, 1-methyl-2,2,3,3-tetrafluoropropyl acrylate, 1,1-dimethyl-2,2,3,3-tetrafluoropropyl acrylate, 2,2,3,4,4,4-hexaflurobutyl acrylate, 2,2,3,4,4,4-hexafluorobutyl acrylate, 2,2,3,3,4,4,4-heptafluorobutyl acrylate, 1-methyl-2,2,3,4,4,4-hexafluorobutyl acrylate, 1,1-dimethyl-2,2,3,4,4,4-hexafluorobutyl acrylate, etc.

These fluoroalkyl methacrylates and fluoroalkyl acrylates can be used alone or as a mixture thereof.

In the polymer of this invention containing both metal elements and halogen atoms, the amount of carbon-halogen bonds per total of carbon-halogen bonds and carbon-hydrogen bonds is preferably 10% or more. If the amount is less than 10%, the effect of reducing the absorption loss is hardly shown. When the polymer is used as the core material in plastic optical fibers, fluorine and/or chlorine are preferable as the halogen.

The transparent polymer containing both the metal elements and halogen atoms can be produced as follows:

Organic carboxylic acids of the formulae (II) and (III) and a metal compound (an oxide, a hydroxide, a chloride, a nitrate, an acetate, a carbonate, etc. of metal (M) as mentioned above) are mixed in predetermined proportions in a solvent such as an alcohol (e.g. methanol, ethanol), a ketone (e.g. methyl ethyl ketone, butyl ethyl ketone, etc.), benzene, toluene, xylene, etc., at room temperature or a temperature not to lose the double bonds of organic carboxylic acids, e.g., at 80° C. or lower, preferably 50° C. or lower to carry out a preliminary reaction with stirring to give a monomer composition. The thus obtained solution is filtered to give a clear uniform liquid. In this case, the proportions of the organic carboxylic acids and the metal compound may be changed depending on the kinds of compounds used.

Considering the heat resistance of the polymer, it is preferable to react 0.05/n (wherein n is the valence fo metal) mole or more of a metal compound with 1 mole of total organic carboxylic acids so as to form metallic ion bonds. The upper limit of the amount of metal compound is changed depending on the kinds and amount of the organic carboxylic acids and the metal compounds used. But so long as a transparent and uniform monomer composition can be obtained, it is possible to react approximately equivalent weight of the metal compound, that is 1/n mole of metal compound. On the other hand, when the amount of the metal compound is too small, the heat resistance of the polymer is hardly improved.

Further, it is preferable to use 0.01 to 50% by weight of the monomer composition containing a carboxylic acid monomer having at least one carboxyl group ionically bonded to a carboxyl group of a carboxylic acid containing one or more fluorine and/or chlorine atoms via a metal element based on the total weight of the monomers. When the amount is less than 0.01% by weight, the effect of reducing the absorption loss due to the introduction of the halogen atoms and metal ions is not shown. On the other hand, when the amount is more than 50% by weight, mechanical strength of the polymer is lowered.

The organic carboxylic acid of the formula (II) (e.g. RCOOH) and the organic carboxylic acid of the formula (III) (R'COOH) are used preferably 95:5 to 20:80 in a molar ratio, more preferably 90:10 to 30:70 in a molar ratio. When the amount of RCOOH is more than 95% by mole, transparency of the polymer is undesirably lost. On the other hand, when the amount of RCOOH is less than 20% by mole, the resulting polymer becomes poor in heat resistance and mechanical strength due to the lessened amount of organic carboxylic acid having the double bond.

Then, by-products produced by the reaction, water and unreacted reactants dissolved in the solvent are removed by distillation under reduced pressure together with the solvent to give a purified monomer composition.

The resulting monomer composition alone or together with one or more radically copolymerizable vinyl monomers is polymerized by heat or ultraviolet light. As the polymerization method, there can be employed any one of emulsion, suspension, bulk and solution polymerizations. In order to obtain a high purity polymer, the bulk polymerization is preferable.

As the polymerization initiator in the case of polymerization of the monomer composition by heat, there can be used conventionally used radical polymerization initiators such as benzoyl peroxide, lauroyl peroxide, diisopropyl peroxydicarbonate, dimyristyl peroxydicarbonate, azobisisobutyronitrile, di-t-butyl peroxide, etc.

As the polymerization initiator in the case of polymerization of the monomer composition by ultraviolet light, there can be used benzoin isopropyl ether, benzoin ethyl ether, benzoin isobutyl ether, α-allylbenzoin, α-methylbenzoin, benzophenone, benzil, 2-ethylanthraquinone, etc. Such polymerization initiators can be used alone or together with a polymerization initiator by heat.

The polymerization initiator is used preferably in an amount of 0.02 to 5 parts by weight per 100 parts by weight of the monomer composition.

The polymer used as the cladding material should have a refractive index lower than that of the core material by at least 0.3%, preferably 1% or more. When the difference in refractive indexes between the core material and the cladding material is less than 0.3%, the light with higher mode is easily broken through, resulting in enlarging the transmission loss. As the polymer for the cladding material, there can be used copolymers of fluorine-containing resins of tetrafluoroethylene, hexafluoropropylene, fluorinated vinylidene, trifluorochloroethylene, and the like; fluoroalkyl acrylate polymers, tetrafluoroethylene-fluorinated vinylidene-fluoroalkyl methacrylate copolymers, fluoroalkyl methacrylatefluoroalkyl acrylate copolymers, silicone resins, and the like elastomers. Further, the above-mentioned halogen and metal-containing polymer having the constituting units of the formulae (I-a) to (I-c) can also be used as the cladding material by lowering the refractive index 0.3% or more compared with that of the core material.

The plastic optical fibers of this invention can be produced by a variety of processes.

One process for producing the plastic optical fiber comprises supplying to a core-clad spinneret the amorphous and optically transparent polymer containing metal elements and halogen atoms as a core material and a polymer having a refractive index lower than that of the core material by at least 0.3% as a cladding material, and conducting complex melt spinning. In this case, the polymer used as the core material is poor in fluidity due to containing metal elements, but it is possible to flow the polymer with heating while adjusting the proportions of individual components of the monomer composition comprising a metal compound and the organic carboxylic acids of the formulae (II) and (III) for giving the constituting units of the formulae (I-a) to (I-c).

Another process for producing the plastic optical fiber comprises carrying out polymerization and curing of a core forming material comprising monomers containing at least metal elements and halogen atoms in a tube or a pipe having a predetermined constant diameter, and if necessary carrying out post-curing to give a half-cured or completely cured fibrous polymer as a core material, and coating the core material with a polymer having a refractive index lower than that of the core material by at least 0.3% to form a clad.

For example, a mixture of the monomer composition containing the metal elements and the halogen atoms, and a vinyl monomer is passed through a Teflon tube having a diameter of 0.3 to 3 mm at a constant rate in a predetermined time with heating at a temperature of 30° to 80° C. to gradually cure and to form fibers, followed by post-curing at a higher temperature in order to form the core material. As one method for forming the clad, there can be used a process wherein one or more monomers for forming the cladding material are used, and the core material is dipped in the monomers for the cladding material and coated in the desired thickness, followed by polymerization and curing of the monomer(s) of the cladding material with heat or ultraviolet light.

When the metal- and halogen-containing polymer is used as an optical material other than plastic optical fibers, it is particularly preferable to use a polymer having a repeating unit of the formula:

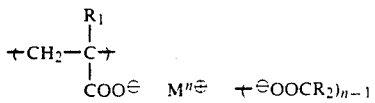

wherein R is hydrogen or a methyl group; $R_2$ is an aliphatic or aromatic hydrocarbon group containing one or more bromine and/or chlorine atoms; and M and n are as defined above.

As the monomer for providing the moiety of $R_2COO\ominus$, there can be used halogen-containing organic carboxylic acid represented by the formula:

$R_2COOH$ (V)

wherein $R_2$ is as defined above. As the carboxylic acid of the formula (V), it is preferable to use saturated or unsaturated aliphatic or aromatic carboxylic acids with $R_2$ having 3 carbon atoms or more and one or more bromine and/or chlorine atoms. When the carbon atom number of $R_2$ is 2 or less, there is a tendency to lower the transparency of the polymer. Further, when the carbon atom number of $R_2$ is more than 20, there is a tendency to color the resulting polymer yellow, or to lessen the effect for making the polymer low in the dispersion. Therefore, it is necessary to select a proper organic carboxylic acid having a suitable hydrocarbon group depending on optical properties required of the resulting polymer. Examples of the organic carboxylic acids of the formula (V) are saturated aliphatic carboxylic acids such as bromopropionic acid, bromobutyric acid, bromovaleric acid, bromohexanoic acid, bromopentanoic acid, bromoundecanoic acid, α-bromoisobutyric acid, 2-bromo-3-methyl-n-butyric acid, dibromopropionic acid, chloropropionic acid, chlorobutyric acid, chlorovaleric acid, β, β'-dichloropivalic acid, etc; saturated aromatic carboxylic acids such as bromobenzoic acid, α-bromo-p-toluic acid, bromophenylacetic acid, chlorobenzoic acid, chlorophenylacetic acid, chlorphenoxyacetic acid, dichlorophenoxyacetic acid, trichlorophenoxyacetic acid, trichlorophenoxypropionic acid, etc.; unsaturated aromatic carboxylic acids such as chlorocinnamic acid, dichlorocinnamic acid, etc. These organic carboxylic acids can be used alone or as a mixture thereof. It is also possible to use one or more organic carboxylic acids containing no halogen atom together with the halogen-containing carboxylic acids of the formula (V).

As the metal elements contained in the polymer, there can be used the same metal elements explained above as to the constituting unit of the formula (I-b).

It is also possible to co-use one or more radically polymerizable vinyl monomers which can give colorless and transparent polymers. Examples of the vinyl monomers are styrene, styrene derivatives such as halogen-containing styrenes such as chlorostyrene, bromostyrene, etc.; acrylic esters, methacrylic esters, halogen-containing acrylic esters and halogen-containing methacrylic esters.

The polymer having the repeating unit of the formula (IV) can be produced in the same manner as the polymer having the constituting units of the formulae (I-a) to (I-c).

The thus produced polymer with low dispersion and high refractive index has high optical transparency. Further, since this polymer has a three-dimensional structure via metal elements, it is excellent in processability and can remarkably easily be subjected to cutting and polishing. Further, this polymer is good in coating properties on the surfaces of lenses. For example, plastic lenses can be produced by pouring a mixed liquid obtained by mixing the monomer composition mentioned above and a polymerization initiator into a mold (made of glass or a metal), or a matrix constructed by a gasket, and polymerizing and curing the mixed liquid by heating or irradiation with ultraviolet light.

This invention is illustrated by way of the following Examples, in which all parts and percents are by weight unless otherwise specified.

In the following Examples, various properties of polymers and plastic optical fibers were measured by the following test methods.

(1) Refractive index ($n_D$) and Abbe number:

Using an Abbe's refractometer, refractive indexes and Abbe numbers were measured at 25° C. As a contact liquid, α-monobromoaphthalene was used.

(2) Glass transition temperature (Tg):

The glass transition temperature (Tg) was obtained from temperature changes in linear expansion coefficients measured by using a thermophysical tester TMA (mfd. by Shinku Riko Sha, Japan). (3) Light transmission loss:

Light beams emitted from a halogen lamp driven by a stabilized electric source was made into parallel beams through a lens, and made into a monochromatic light by a diffraction grating spectrometer. Using this light as a light source and a sample with 5 to 10 m long, an incident light amount and an emergent light amount were measured by using a light power meter to give average values of light transmission loss. The transmission loss L is given by the following equation:

$$L = -\frac{10}{l} \log \frac{I}{I_0}$$

wherein $I_0$ is an incident light amount; I is an emergent light amount; and l is a sample length.

The light transmission loss was also measured after allowing plastic optical fibers to stand at 80° C. for 1000 hours in addition to the measurement of initial properties. By this method, changes in loss properties were measured.

(4) Light transmittance:

Light transmittance through a sample of 2 mm thick was measured by using a haze meter (mfd. by Suga Test Instruments, Ltd., Japan) according to ASTM 1003.

(5) Pencil hardness:

Pencil hardness was measured according to JIS K 5400.

Examples 1 to 8 relate to plastic optical fibers.

EXAMPLE 1

In 300 parts of methanol, 12 parts of methacrylic acid and 57 parts of perfluorooctanoic acid were dissolved and maintained at 35° C. for 3 hours. Then, 31 parts of lead monooxide was added thereto gradually to carry out a preliminary reaction. After filtering the resulting solution, the water by-produced and methanol were removed under reduced pressure to give a monomer composition. After uniformly mixing 5 parts of the monomer composition, 95 parts of trifluoroethyl methacrylate, 0.02 part of di-t-butyl peroxide as a polymerization initiator and 0.4 part of n-butylmercaptan as a chain transfer agent, the resulting mixture was subjected to bulk polymerization in a closed system containing substantially no oxygen at 100° C. for 10 hours, and at 130° C. for 10 hours, followed by gradual temperature rise to increase the conversion. Finally, the polymerization was completed at 180° C. to give a polymer for a core material. On the other hand, using 2,2,3,3,3-pentafluoropropyl methacrylate polymer as a cladding material together with the core material, melt spinning was conducted by using a complex spinneret to give an optical fiber having a core diameter of 0.5 mm and a clad thickness of 0.05 mm.

Infrared absorption spectra of the core polymer revealed that the absorption at 1695 cm$^{-1}$ due to the $>$C$=$O in —COOH almost disappeared and an absorption at 1500–1560 cm.$^{-1}$ due to $>$C$=$O in —COO$^{\ominus}$ bonded to Pb$^{2+}$ was observed. Further, a strong absorption at 1220–1260 cm$^{-1}$ due to —CF$_3$ and $>$CF$_2$ groups was also observed.

From the above data, it can be confirmed that the obtained polymer has ionic bonds between the methacrylic acid and Pb$^{2+}$, and the perfluorooctanoic acid and Pb$^{2+}$.

EXAMPLE 2

In methyl ethyl ketone, 41 parts of methacrylic acid, and 37 parts of heptafluorobutyric acid were dissolved and maintained at 40° C. for 3 hours. Then, 22 parts of barium hydroxide monohydrate [Ba(OH)$_2$.H$_2$O] was added thereto gradually to carry out a preliminary reaction. After filtering the resulting solution, the water by-produced and methyl ethyl ketone were removed under reduced pressure to give a monomer composition. After uniformly mixing 10 parts of the monomer composition, 90 parts of 1H,1H-heptafluoropropyl methacrylate, 0.02 part of di-t-butyl peroxide and 0.4 part of n-butylmercaptan, the resulting mixture was subjected to bulk polymerization in a closed system containing substantially no oxygen at 100° C. for 10 hours and at 130° C. for 10 hours, followed by gradual temperature rise to increase the conversion. Finally, the polymerization was completed at 180° C. to give a polymer for a core material. On the other hand, using 2,2,3,3,3-pentafluoropropyl methacrylate polymer as a cladding material together with the core material, melt spinning was conducted by using a complex spinneret to give an optical fiber having a core diameter of 0.7 mm and clad thickness of 0.05 mm.

EXAMPLE 3

In benzene, 31 parts of methacrylic acid and 47 parts of chlorodifluoroacetic acid were dissolved and maintained at 35° C. for 3 hours. Then, 22 parts of zinc oxide was added thereto gradually to carry out a preliminary reaction. After filtering the resulting solution, the water by-produced and the benzene were removed under reduced pressure to give a monomer composition. After uniformly mixing 10 parts of the monomer composition, 90 parts of trifluoroethyl methacrylate, 0.02 part of di-t-butyl peroxide and 0.4 part of n-butyl mercaptan, the resulting mixture was subjected to bulk polymerization in a closed system containing substantially no oxygen at 100° C. for 10 hours and at 130° C. for 10 hours, followed by gradual temperature rise to increase the conversion. Finally, the polymerization was completed at 180° C. to give a polymer for a core material. On the other hand, using 2,2,3,3,3-pentafluoropropyl methacrylate polymer as a cladding material together with the core material, melt spinning was conducted by using a complex spinneret to give an optical fiber having a core diameter of 0.5 mm and a clad thickness of 0.05 mm.

EXAMPLE 4

In benzene, 17 parts of methacrylic acid and 42 parts of heptafluorobutyric acid were dissolved and maintained at 35° C. for 3 hours. Then, 41 parts of lead monooxide was added thereto gradually to carry out a preliminary reaction. After filtering the resulting solution, the water by-produced and the benzene were removed under reduced pressure to give a monomer composition. After uniformly mixing 5 parts of the monomer composition, 75 parts of trifluoroethyl methacrylate, 20 parts of methyl methacrylate, 0.02 part of di-t-butyl peroxide and 0.4 part of n-butylmercaptan, the resulting mixture was subjected to bulk polymerization in a closed system containing substantially no oxygen at 100° C. for 10 hours and at 130° C. for 10 hours, followed by gradual temperature rise to increase the conversion. Finally, the polymerization was completed at 190° C. to give a polymer for a core material. On the other hand, using 2,2,3,3,3-pentafluoropropyl methacrylate polymer as a cladding material together with the core material, melt spinning was conducted by using a complex spinneret to give an optical fiber having a core diameter of 0.7 mm and a clad thickness of 0.05 mm.

COMPARATIVE EXAMPLE 1

After uniformly mixing 100 parts of 1H,1H,3H-tetrafluoropropyl methacrylate, 0.02 part of di-t-butyl peroxide, and 0.4 part of n-butylmercaptan, the resulting mixture was subjected to bulk polymerization in a closed system containing substantially no oxygen at 130° C. for 20 hours, followed by gradual temperature rise to increase the conversion. Finally, the polymerization was completed at 180° C. to give a polymer for a core material. On the other hand, using 2,2,3,3,3-pentafluoropropyl methacrylate polymer as a cladding material together with the core material, melt spinning was conducted by using a complex spinneret to give an optical fiber having a core diameter of 0.5 mm and a clad thickness of 0.05 mm.

Various properties of plastic optical fibers of Examples 1 to 4 and Comparative Example 1 were tested and shown in Table 1.

TABLE 1

| Example No. | Properties of core polymer | | Initial transmission loss (dB/km) | | | Transmission loss after stored at 80° C. for 1000 hrs. (dB/km) | | |
|---|---|---|---|---|---|---|---|---|
| | Refractive index $n_D^{25}$ | Tg (°C.) | 570 nm | 650 nm | 770 nm | 570 nm | 650 nm | 770 nm |
| 1 | 1.417 | 88 | 180 | 250 | 630 | 210 | 300 | 700 |
| 2 | 1.421 | 93 | 210 | 280 | 720 | 230 | 310 | 810 |
| 3 | 1.435 | 85 | 210 | 270 | 700 | 240 | 320 | 790 |
| 4 | 1.463 | 95 | 220 | 310 | 780 | 240 | 330 | 820 |
| Comparative | 1.420 | 75 | 150 | 210 | 500 | >1000 | >1000 | >1000 |

TABLE 1-continued

| Example No. | Properties of core polymer | | Initial transmission loss (dB/km) | | | Transmission loss after stored at 80° C. for 1000 hrs. (dB/km) | | |
|---|---|---|---|---|---|---|---|---|
| | Refractive index $n_D^{25}$ | Tg (°C.) | 570 nm | 650 nm | 770 nm | 570 nm | 650 nm | 770 nm |
| Example 1 | | | | | | | | |

EXAMPLE 5

The transparent polymer obtained in Example 4 having a refractive index of 1.463 was used as a core material and the transparent polymer obtained in Example 1 having a refractive index of 1.417 was used as a cladding material. These transparent polymers were subjected to melt spinning at 200° C. to 250° C. by using a complex spinneret to give an optical fiber having a core diameter of 1 mm and a clad thickness of 0.05 mm.
Properties of the optical fiber were as follows:
Transmission loss at initial stage:
  570 nm . . . 190 dB/km 650 nm . . . 280

770 nm . . . 600 4

Transmission loss after stored at 80° C. for 1000 hours:
  570 nm . . . 220 dB/km 650 nm . . . 315

EXAMPLE 6

As the core material, the same transparent polymer as used in Example 5 was used. As the cladding material, there was used a solution obtained by uniformly mixing 5 parts of the monomer composition used in Example 1, 95 parts of trifluoroethyl methacrylate and 3 parts of 1-hydroxycyclohexyl phenyl ketone as a photopolymerization initiator.
After immersing the core material in the solution for the cladding material continuously, the resulting materials were passed through a die having a diameter of about 1 mm and cured by using ultraviolet rays continuously. The resulting optical fiber had a core diameter of 1.0 mm and a clad thickness of 0.08 mm. Properties of the optical fiber were as follows:
Transmission loss at initial stage:
  570 nm . . . 200 dB/km 650 nm . . . 250

770 nm . . . 700

Transmission loss after stored at 80° C. for 1000 hours:
  570 nm . . . 220 dB/km 650 nm . . . 265

770 nm . . . 725

EXAMPLE 7

As a core material of an optical fiber, transparent poly(methyl methacrylate) having a refractive index of 1.490 was used, and as a cladding material the transparent polymer obtained in Example 1 having a refractive index of 1.417 was used. These transparent polymers were subjected to melt spinning at 220° C. to 270° C. by using a complex spinneret to give an optical fiber having a core diameter of 1 mm and a clad thickness of 0.05 mm.
Properties of the optical fiber were as follows:
Transmission loss at initial stage:
  570 nm . . . 250 dB/km 650 nm . . . 390 dB/km 770 nm . . . >1000

Transmission loss after stored at 80° C. for 1000 hours:
  570 nm . . . 260 dB/km 650 nm . . . 420

770 nm . . . >1000

EXAMPLE 8

A mixture obtained by uniformly mixing 40 parts of the monomer composition containing lead and fluorine as obtained in Example 1, 60 parts of trifluoroethyl methacrylate, and 0.2 part of dimyristyl peroxydicarbonate as a polymerization initiator was injected into a Teflon tube having an inner diameter of 1 mm and a length of 5 m used for liquid chromatography by using a plunger pump under a pressure of 50 kg/cm². The Teflon tube was placed in a constant temperature bath at 60° C. and a fibrous semi-polymer was taken out successively from one end of the Teflon tube. The successively taken out fibrous semi-polymer was continuously passed through a constant temperature bath at 150° C. to give a polymer for a core mterial of a plastic optical fiber. On the other hand, 2,2,3,3,3-pentafluoropropyl methacrylate polymer was used as a cladding material. After dissolving the cladding material in a mixed solvent of ethyl acetate and toluene (1:1 by volume), the polymer for the core material was dipped in the resulting solution continuously, followed by drying at 150° C. for 10 seconds to remove the solvent and to give an optical fiber having a core diameter of 1 mm and a clad thickness of 0.05 mm.
Properties of the optical fiber were as follows:
Properties of core polymer:
  Refractive index $n_D^{25} = 1.452$
  Tg = 102° C.
Transmission loss at initial stage:
  570 nm . . . 175 dB/km 650 nm . . . 240

770 nm . . . 600

Transmission loss after stored at 80° C. for 1000 hours:

570 nm ... 200 dB/km 650 nm ... 250

700 nm ... 650

The following Examples 9 to 13 relate to production of amorphous and transparent polymers containing metal elements and halogen atoms with low dispersion and high refractive index.

EXAMPLE 9

In 27 parts of styrene, 27 parts of methacrylic acid and 11 parts of 6-bromohexanoic acid [$Br(CH_2)_5COOH$] were dissolved. Then, 35 parts of lead monooxide was gradually added thereto to conduct a preliminary reaction at room temperature. As a result, a transparent monomer composition was obtained. The monomer composition added with 0.2 part of dimyristyl peroxydicarbonate as a polymerization initator was poured into a mold for casting constructed with a pair of glass molds and a gasket. After maintaining at 60° C. for 4 hours, at 90° C. for 3 hours and at 110° C for 1 hour, a colorless and transparent polymer was obtained. Properties of the polymer were tested and shown in Table 2.

EXAMPLE 10

In 200 ml of benzene, 36 parts of methacrylic acid, and 22 parts of p-bromophenylacetic acid were dissolved, and 42 parts of lead monooxide was gradually added thereto to conduct a preliminary reaction at room temperature. After the preliminary reaction, 100 parts of chlorostyrene was added to the resulting solution and the water which was a by-product and the benzene were removed under reduced pressure to give a clear monomer composition. To 100 parts of the monomer composition, 0.2 part of dimyristyl peroxydicarbonate was added and the polymerization was carried out in the same manner as described in Example 9 to give a pale yellow and transparent polymer. Properties of the polymer were tested and shown in Table 2.

EXAMPLE 11

In benzene containing 33 parts of 2-hydroxyethyl methacrylate, 19 parts of acrylic acid, 4 parts of dibromopropionic acid and 9 parts of 6-bromohexanoic acid were dissolved and maintained at 35° C for 3 hours. Then, 35 parts of barium hydroxide octahydrate was gradually added thereto to carry out a preliminary reaction. After removing the water by-produced and benzene contained in the solution under reduced pressure, the monomer composition was obtained. To 65 parts of the monomer composition, 35 parts of styrene, and 0.2 part of dimyristyl peroxydicarbonate were added and the polymerization was carried out in the same manner as described in Example 6 to give a colorless and transparent polymer. Properties of the polymer were tested and shown in Table 2.

EXAMPLE 12

In benzene, 54 parts of methacrylic acid and 21 parts of 5-chlorovaleric acid were dissolved and maintained at 30° C. for 5 hours. Then, 25 parts of barium hydroxide monohydrate was gradually added thereto to carry out a preliminary reaction. After removing the water by-produced and benzene contained in the solution under reduced pressure, the monomer composition was obtained. To 14 parts of the monomer composition, 86 parts of methyl methacrylate and 0.15 part of dimyristyl peroxydicarbonate was added and the polymerization was carried out in the same manner as described in Example 6 to give a colorless and transparent polymer. Properties of the polymer were tested and shown in Table 2.

EXAMPLE 13

In benzene, 48 parts of acrylic acid and 36 parts of 3,4-dichlorocinnamic acid were dissolved and maintained at 30° C. for 5 hours. Then, 16 parts of barium oxide was gradually added thereto to carry out a preliminary reaction. After removing the water by-produced and benzene contained in the solution under reduced pressure, the monomer composition was obtained. To 50 parts of the monomer composition, 50 parts of chlorostyrene and 0.2 part of dimyristyl peroxydicarbonate were added and the polymerization was carried out in the same manner as described in Example 9 to give a colorless and transparent polymer. Properties of the polymer were tested and shown in Table 2.

TABLE 2

| | Properties of polymer | | | |
|---|---|---|---|---|
| | Total light transmittance (%) | Refractive index | Abbe number | Pencil hardness |
| Example 9 | 89 | 1.595 | 35 | H |
| Example 10 | 88 | 1.602 | 34 | H |
| Example 11 | 90 | 1.568 | 39 | 2H |
| Example 12 | 92 | 1.517 | 55 | 3H |
| Example 13 | 90 | 1.592 | 34 | 2H |
| Comparative Example 2*[1] | 89 | 1.584 | 29 | HB |
| Comparative Example 3*[2] | 89 | 1.589 | 31 | HB |

Note)
*[1]Commercially available polycarbonate
*[2]Commercially available polystyrene As exaplained above, the plastic optical fibers of this invention are small in light transmission loss in the visible light region to the near infrared region and excellent in heat resistance.

Further, the polymer of this invention has low dispersion and a high refractive index as well as high optical transparency and is excellent in processability. Thus, cutting and polishing can be carried out remarkably easy. Further, the polymer of this invention is good in coating properties on the surfaces of lenses. Therefore, the polymer of this invention has an industrially high value.

What is claimed is:

1. A plastic optical fiber comprising a core and a clad, said core being formed by an amorphous and optically transparent polymer and said clad being formed by a polymer having a refractive index lower than that of the core by at least 0.3%, at least one of the core and the clad being formed by an amorphous and transparent polymer containing metal elements and halogen atoms, wherein the polymer containing metal elements and halogen atoms has constituting units of the formula:

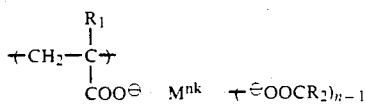

wherein $R_1$ is a hydrogen or a methyl group; $R_2$ is an aliphatic hydrocarbon group, containing one or more halogens selected from the group consisting of bromine, fluorine and chlorine; M is a metal element; and n is a valence of the metal element M, said amorphous and transparent polymer containing metal elements and halogen atoms having a light transmittance of at least 80%.

2. A plastic optical fiber according to claim 1, wherein the number of carbon atoms in $R_2$ is 3-20.

3. A plastic optical fiber comprising a core and a clad, said core being formed by an amorphous and optically transparent polymer and said clad being formed by a polymer having a refractive index lower than that of the core by at least 0.3%, at least one of the core and the clad being formed by an amorphous and transparent polymer containing metal elements and halogen atoms, wherein the polymer containing metal elements and halogen atoms has constituting units of the formula:

wherein $R_1$ is a hydrogen or a methyl group; $R_2$ is an aliphatic hydrogen group, containing one or more halogens selected from the group consisting of bromine, fluorine and chlorine; M is a metal element; and n is a valence of the metal element M, the amorphous and transparent polymer containing metal elements and halogen atoms having a refractive index of at most 1.60.

4. A plastic optical fiber according to claim 1 wherein the metal element is at least one member selected from the group consisting of Pb, Ba, Zn, Sn, Sb, Mg, Hg, Ca La, Ti, Zr, Th, Nb, Tl, Ge, Cs, and Cd.

5. The plastic optical fiber according to claim 4, wherein the metal element is at least one member selected from the group consisting of Pb, Ba, Sr, Zn, Mg, Ca, La, Cd and Hg.

6. A plastic optical fiber according to claim 1, wherein the polymer is obtained from a monomer mixture comprising at least one radically polymerizable vinyl monomer and a monomer composition obtained by preliminary reacting at least one organic carboxylic acid of the formula: RCOOH or R(COOH)$_2$ wherein R is a group forming a polymer main chain and $R_1$, or an alkyl ester thereof provides

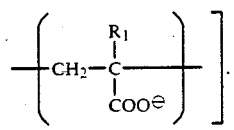

at least one organic carboxylic acid of the formula: $R_2$COOH wherein $R_2$ is as defined previously, and at least one metal compound.

7. A plastic optical fiber according to claim 6, wherein 0.05/n mole or more, n being the valence of metal, of the metal compound is used per mole of the total of organic carboxylic acids.

8. A plastic optical fiber according to claim 1, wherein the polymer has 10% or more of carbon-halogen bonds based on the total of carbon-halogen bonds and carbon-hydrogen bonds.

9. A plastic optical fiber according to claim 6, wherein the amount of the monomer composition is 0.01 to 50% by weight based on the total weight the monomer mixture.

10. A plastic optical fiber according to claim 1, wherein the amorphous and transparent polymer containing metal elements and halogen atoms has a refractive index of at most 1.60.

11. A plastic optical fiber according to claim 1, wherein said clad is formed of a polymer having a refractive index lower than that of the core by at least 1%.

* * * * *